(12) United States Patent
Mason (10) Patent No.: US 7,979,445 B2
(45) Date of Patent: Jul. 12, 2011

(54) PROCESSES FOR ASSESSING USER AFFINITIES FOR PARTICULAR ITEM CATEGORIES OF A HIERARCHICAL BROWSE STRUCTURE

(75) Inventor: Zachary J. Mason, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/900,259

(22) Filed: Oct. 7, 2010

(65) Prior Publication Data

US 2011/0022606 A1   Jan. 27, 2011

Related U.S. Application Data

(63) Continuation of application No. 10/684,313, filed on Oct. 13, 2003, now Pat. No. 7,836,051.

(51) Int. Cl.
G06F 17/30 (2006.01)

(52) U.S. Cl. ......... 707/748; 707/734; 707/751; 707/784

(58) Field of Classification Search .............. 707/1, 3, 707/5, 10, 100, 734, 748, 751, 784, 949
See application file for complete search history.

(56) References Cited

U.S. PATENT DOCUMENTS

| | | | |
|---|---|---|---|
| 4,870,579 A | 9/1989 | Hey | |
| 5,221,261 A | 6/1993 | Termin et al. | |
| 5,848,396 A | 12/1998 | Gerace | |
| 6,266,649 B1 | 7/2001 | Linden et al. | |
| 6,321,179 B1 | 11/2001 | Glance et al. | |
| 6,321,221 B1 | 11/2001 | Bieganski | |
| 6,334,127 B1 | 12/2001 | Bieganski et al. | |
| 6,366,910 B1 | 4/2002 | Rajaraman et al. | |
| 6,438,579 B1 * | 8/2002 | Hosken | 709/203 |
| 6,460,025 B1 | 10/2002 | Fohn et al. | |
| 6,460,036 B1 | 10/2002 | Herz | |
| 6,466,918 B1 | 10/2002 | Spiegel et al. | |
| 6,484,149 B1 | 11/2002 | Jammes et al. | |
| 6,489,968 B1 | 12/2002 | Ortega et al. | |
| 6,606,102 B1 | 8/2003 | Odom | |
| 6,606,619 B2 | 8/2003 | Ortega et al. | |
| 6,611,842 B1 * | 8/2003 | Brown | 707/999.006 |
| 6,757,691 B1 | 6/2004 | Welsh et al. | |
| 6,853,982 B2 | 2/2005 | Smith et al. | |
| 6,912,505 B2 | 6/2005 | Linden et al. | |

(Continued)

OTHER PUBLICATIONS

Middleton, S., De Roure, D., and Shadbolt, N., "Capturing knowledge of user preferences: ontologies in recommender systems," Proceedings of the International Conference on Knowledge Capture, Victoria, BC Canada, ACM Press, pp. 100-107 (2001) (of-record in parent application).

(Continued)

*Primary Examiner* — Tim T. Vo
*Assistant Examiner* — Dangelino N Gortayo
(74) *Attorney, Agent, or Firm* — Knobbe, Martens, Olson & Bear LLP (57) ABSTRACT

A computer-implemented system provides a browse tree in which items represented within a database are arranged within a hierarchy of item categories. Each time a user selects an item, an amount of credit is cumulatively assigned to the ancestor nodes (categories) of the selected item. The amount of credit assigned to a particular category of the browse tree over time for a given user represents the user's predicted affinity for that category. The user's relative preferences for some or all of the categories are predicted by calculating differences between the user's predicted affinities for such categories and the predicted affinities of a population of users for such categories. Scores reflective of these relative category preferences are used to provide personalized recommendations or other personalized content to the user.

18 Claims, 4 Drawing Sheets

U.S. PATENT DOCUMENTS

| | | | |
|---|---|---|---|
| 6,963,867 B2 | 11/2005 | Ford et al. | |
| 7,003,503 B2 | 2/2006 | Crosby et al. | |
| 7,013,300 B1 | 3/2006 | Taylor | |
| 7,089,237 B2* | 8/2006 | Turnbull et al. | 707/999.05 |
| 7,295,995 B1* | 11/2007 | York et al. | 705/26.8 |
| 7,328,216 B2* | 2/2008 | Hofmann et al. | 707/999.1 |
| 7,783,617 B2* | 8/2010 | Lu et al. | 707/706 |
| 2001/0014868 A1 | 8/2001 | Herz et al. | |

OTHER PUBLICATIONS

Widyantoro, D., Loerger, T., and Yen J., "An adaptive algorithm for learning changes in user interests," Proceedings of the Eighth International Conference on Information Knowledge Management, Kansas City, Missouri, ACM Press, pp. 405-412 (1999) (of-record in parent application).

Mobasher, B., Cooley, R., and Srivastava, J., "Automatic personalization based on Web usage mining," Communications of the ACM, vol. 43, Issue 8, pp. 142-151 (Aug. 2000) (of-record in parent application).

Resnik, P., "Selection and Information: A Class-Based Approach to Lexical Relationships," The Institute for Research in Cognitive Science, pp. 1-161 (Dec. 1993) (of-record in parent application).

* cited by examiner

PROCESSES FOR ASSESSING USER AFFINITIES FOR PARTICULAR ITEM CATEGORIES OF A HIERARCHICAL BROWSE STRUCTURE

PRIORITY CLAIM

This application is a continuation of U.S. application Ser. No. 10/684,313, filed Oct. 13, 2003, the disclosure of which is hereby incorporated by reference.

BACKGROUND OF THE INVENTION

1. Field of the Invention

The present invention relates to systems and methods for analyzing browse activity data of users of a database access system, and more specifically, to the analysis of item selection histories of users of a database access system to predict category preferences or affinities of such users.

2. Description of the Related Art

Web sites and other types of interactive systems commonly host electronic catalogs for assisting users in locating and evaluating various types of items. The items may, for example, include physical products, journal articles, movie and music titles, downloadable software, services, stock assets, businesses, and/or any other type of item that may be represented in a database. Electronic catalog systems also commonly support the ability for users to conduct various types of item-related transactions, such as downloading an item or purchasing an item.

Typically, the items within the electronic catalog are grouped into various categories and subcategories to facilitate navigation. These categories and subcategories are often organized into a hierarchical structure referred to as a browse tree, although the structure need not actually be a tree structure in a strict sense. The leaf nodes (nodes that do not have any children) of the browse tree typically represent the items themselves, while the non-leaf or category nodes represent categories of items. Selection of a category node typically causes its immediate children, which may be specific items or other item categories, to be displayed. Users can thus interactively navigate the browse tree to locate items of interest. Other types of navigation tools, such as a search engine that supports constraint-based searches, may also be provided to assist users in locating items.

To further assist users in locating items of interest, many Web sites use recommendations systems, and other types of personalization applications, to personalize Web pages for users. For example, some systems recommend specific items and item categories to users based on the past browsing activities of such users.

SUMMARY

One problem with existing recommendation systems is that they commonly fail to take into account the relative affinities or preferences users have for specific item categories. For example, a recommendation system may fail to recognize that a user has an affinity for a relatively unpopular item category. Unless the user's relatively high affinity for this item category is taken into consideration, the recommendations provided by the system may often be of only limited value to the user. For example, the system may tend to recommend items that are generally popular among all users, and which are therefore already known to the target user.

The present invention addresses this problem by providing a system for identifying the relative category preferences or affinities of users. In a preferred embodiment, the system includes a hierarchical browse structure or "browse tree" in which items are arranged within a hierarchy of item categories. As a user navigates the browse tree, the user's activity is monitored and recorded in a database to create a user-specific item selection history. The item selection history may also reflect item selections made outside the browse tree (e.g., selection of an item on a search results page). Item selection histories may be maintained for some or all users of the system.

An analysis component uses the item selection history of each user, and possibly other types of activity data for the user, to generate user-specific category preference scores for some or all of the category nodes of the browse tree. This may be accomplished in-part by assigning an amount of credit to each item selection event within the user's item selection history (with this amount optionally being based on the type of selection action performed), and distributing this amount of credit equally among all of the ancestor nodes (categories) of the browse tree while summing credit amounts assigned to like nodes. In addition to calculating individual category preference scores that are user-specific, a set of collective category preference scores is calculated based on the activity data collected for an entire population of users. Each such collective category preference score reflects the popularity of a corresponding category among the population of users.

The analysis component also uses a differencing function, such as a relative entropy function, to calculate a difference between a given user's category preference scores and the collective category preference scores of the user population. The result of this calculation is a set of relative category preference scores reflective of the degree to which the user's affinities for specific categories differ from those of the user population. These relative preference scores are preferably used—either alone or in combination with other user profile data—to provide personalized content to the user, such as personalized item and/or category recommendations.

Neither this summary nor the following detailed description is intended to define the invention. The invention is defined by the claims.

BRIEF DESCRIPTION OF THE DRAWINGS

These and other features and advantages of the invention will now be described with reference to the drawings of certain preferred embodiments, which are intended to illustrate and not to limit the invention.

DETAILED DESCRIPTION OF THE PREFERRED EMBODIMENTS

For purposes of illustration, one embodiment of the invention will now be described in the context of a Web site having a browse tree for browsing a catalog of items. The details associated with the Web site and the browse tree of this specific implementation are set forth in order to illustrate, and not to limit, the invention. The scope of the invention is defined only by the appended claims.

Figure 1:
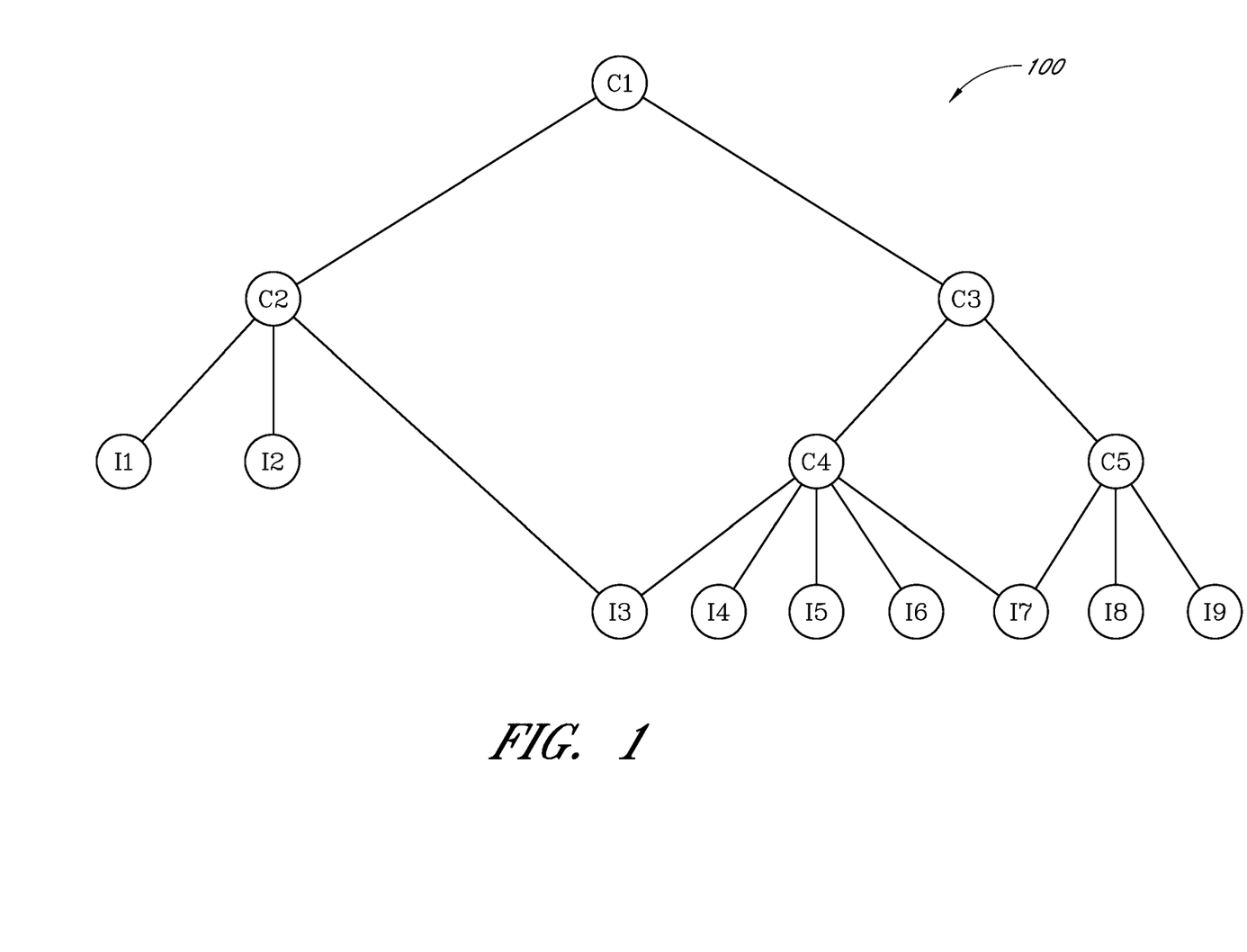
FIG. 1 illustrates an exemplary browse tree for organizing items available through an electronic catalog system into categories and subcategories.

FIG. 1 illustrates a browse tree 100 in which the items of an electronic catalog are arranged within categories and subcategories. The electronic catalog is preferably part of a Web site system. In other embodiments, the electronic catalog may be implemented in a variety of other platforms that support interactive browsing, such as, for example, an online services network, a voice-based browsing system, or an interactive television system. The items may, for example, be physical products (new and/or used), newspaper or journal articles, music files, software downloads, job listings, stocks and bonds, online auctions, and/or any other type of item commonly represented within an electronic catalog and organized by category.

In the example illustrated in FIG. 1, the browse tree 100 consists of five category nodes C1-C5 and nine item nodes I1-I9. Typically, a much greater number of category and item nodes are provided (e.g., hundreds or thousands of category nodes and millions of item nodes). In the illustrated embodiment, the browse tree 100 is in the form of a directed acyclic graph, in which a child node may have multiple parent nodes. The browse tree 100 may alternately be a pure tree structure in which each child node can have only one immediate parent node, or any other suitable organizational structure. The items need not all fall at the same level of the browse tree; for example, some items may be closer to the root node than others.

The lowest-level nodes, or "leaf nodes," of the browse tree 100 represent individual items, and the other nodes represent categories and subcategories in which the items are organized. The browse tree 100 may be presented to users using any appropriate type of user interface, including Web pages, proprietary-format display screens, voice interfaces, and the like. The selection of a particular category node C1-C5 may cause some or all of the immediate children of the node to be displayed.

The types of categories and items included in the browse tree 100 will generally depend upon the nature of the Web site or other system in which the browse tree 100 is implemented. For example, in one embodiment, the electronic catalog system comprises a browsable directory of news articles, and the item nodes I1-I9 represent individual news articles. In another embodiment, the item nodes I1-I9 represent products or services that may be purchased and/or rated by users of the system.

A user can navigate the browse tree 100 to select items of interest for viewing. Selection of an item may, for example, lead to the display of an item detail page that contains detailed information about the item, or if the item consists of electronic content, may cause the item itself to be transmitted to the user's computer (e.g., in the case of a news article or a music file). The system may also support the ability for users to select specific items for purposes of performing other types of actions. Depending upon the nature and purpose of the system, these actions may, for example, include some or all of the following: downloading an item, purchasing an item, rating or reviewing an item, adding an item to an electronic shopping cart or a wish list, forwarding an item or item description to a friend by email, posting a unit of the item for sale in an online marketplace, or submitting a bid for an item. Various other types of selection actions that evidence user affinities for specific items and items categories may also be supported.

The activity of each user within the browse tree 100 is preferably monitored and recorded to generate a user-specific "item selection history" which specifies the items the respective user has downloaded, purchased, reviewed, rated, viewed via an item detail page, added to a personal wish list or shopping cart, and/or for which the user has performed some other type of item-affinity-evidencing action. The types of affinity-evidencing actions for which user-specific histories are maintained will generally vary depending upon the nature and purpose of the electronic catalog system (e.g., user opinions, retail sales, user-to-user sales, online access to media content, music downloads, etc.). Further, only some types of item selection events may be recorded (e.g., purchases only), and not others, may be recorded within the item selection histories.

In accordance with the invention, the items selection histories of the users are used—optionally in combination with other user activity data—to predict users' affinity levels for specific categories of the browse tree 100. These affinity levels are preferably relative levels, meaning that they take into consideration the degree to which a user's category preferences differ from those of a general user population. The resulting data regarding the relative category preferences of specific users is in-turn used to provide personalized content to such users, such as by providing personalized recommendations of items and/or item categories within Web pages. The item selection histories used to predict the relative category preferences of users may be limited to selection actions performed within the browse tree 100, or may extend to selection actions performed outside the browse tree (e.g., selection of an item from a search results listing).

In a preferred embodiment, the categories of interest to the user are identified by distributing credit among the category nodes C1-C5 of the browse tree 100 based on the user's item selection history, or based on specific types of selection actions included in the item selection history. In a preferred embodiment, if a user performs an item selection action that is taken into consideration for purposes of determining category affinity levels, each ancestor (immediate or non-immediate parent) of the selected item receives an amount of credit that is calculated by dividing the total amount of credit associated with the selection action by the corresponding number of ancestor nodes in the browse tree. Thus, for example, if a selected item has a relatively large number of ancestor nodes (e.g., because it falls at a very low level of the browse tree 100), a relatively small amount of credit will be given to each ancestor/category node. As described below, the credits assigned to a particular category are accumulated on both a user-specific basis and on a non-user specific basis to generate two intermediate scores: one which reflects a particular user's affinity for the category, and another which reflects the general popularity of the category among a population of users.

The total amount of credit may be a fixed value, such as one. If multiple types of selection actions are taken into consideration in determining category preferences, the total amount of credit accorded to a given selection action may depend upon the type of the selection action, as shown in Table 1. The selection actions and credit amounts shown in Table 1 are merely examples of those that may be used, and are not intended to imply the need to consider multiple different types of selection actions

TABLE 1

| Item Selection Action | Total Credit |
| --- | --- |
| Download or Purchase | 10 |
| Review or Rate | 9 |
| Bookmark or Add to Shopping Cart | 5 |
| View | 1 |

One advantage of varying the amount of credit based on the type of the selection event is that the system can take into account the degree to which each type of selection action evidences user affinity for the corresponding item. For example, an actual download or purchase of an item purchase can be given more weight than an item viewing event or a shopping cart add event. Other criteria, such as the amount of time spent viewing the item, may also be taken into consideration in determining the total amount of credit to be distributed.

In addition to using the item selection histories of users to identify category affinity levels of users, various other types of user activity data may be taken into consideration. For example, users' selections of specific category nodes may be recorded and taken into consideration. However, to avoid obscuring the description of how users' item selection histories are preferably used to predict users' relative category preferences, the method will be described primarily without reference to the other types of activity data that may be taken into account.

Figure 2:
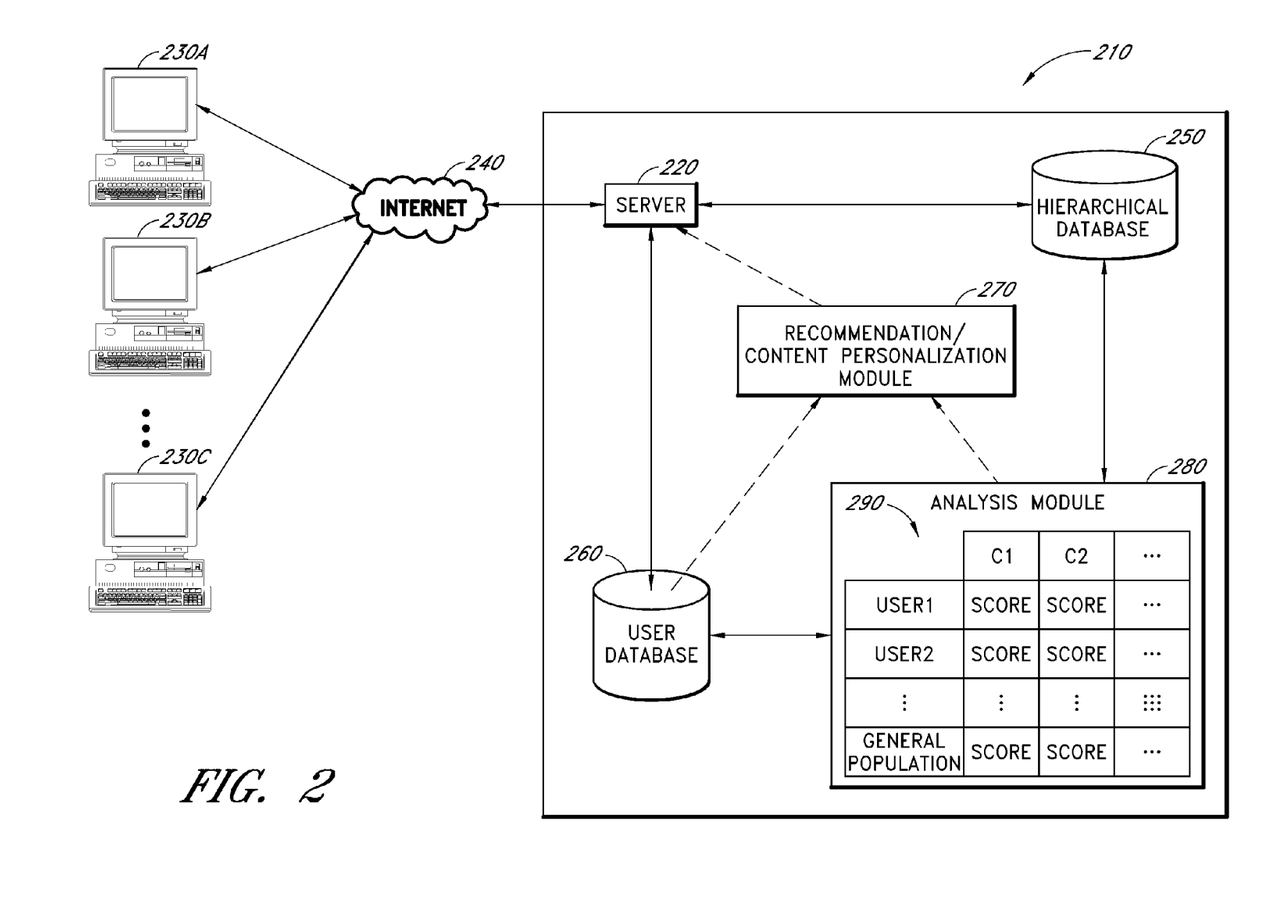
FIG. 2 illustrates a set of Web site components that may be used to profile a user.

FIG. 2 illustrates a set of Web site components that may be used to profile a user according to the invention. As will be appreciated by those skilled in the art, the division of functionality between executable components, and the data structures used by these components, are largely a matter of design choice and can be varied significantly without departing from the scope of the invention. Further, as mentioned above, the invention need not be implemented in conjunction with a Web site.

The Web site system 210 includes a server 220 that processes requests from user computers 230A-C, and/or other types of devices such as personal digital assistants and cellular telephones, via the Internet 240 or other computer network. The server 220 is in communication with a hierarchical database 250, a user database 260, and a recommendation/content personalization module 270. The Web site 210 also includes an analysis module 280 in communication with the hierarchical database 250 and the user database 260, and optionally in communication with the recommendation/content personalization module 270.

The hierarchical database 250 includes records for the items that are accessible through the Web site 210. The hierarchical database 250 also includes information regarding the organization of the items into categories and subcategories within the browse tree 100. The user database 260 includes information about the users of the site and their activity. For example, the user database 260 may include information such as a user's contact information, browsing history within the Web site 210, item selection history, or the like.

In one embodiment, the analysis module 280 accesses the hierarchical database 250 and the user database 260 to generate a category preferences table 290, which preferably contains a category preference score for each (user, category) pair, as shown in FIG. 2. A process for determining these category preference scores (referred to as "individual user history scores" or "individual scores") is described below. Such scores may be generated, for example, for every known user of the Web site 210 or for a selected subset of users, such as those who visit the Web site 210 on a frequent basis. Scores for certain types or levels of category nodes may optionally be omitted. The category preferences table 290 also includes category preference scores for a general user population, referred to as "collective user history scores" or "collective scores." The general user population may, for example, consist of all users that have item selection histories, or of all users meeting some other criteria. A given user need not be an individual, but rather may be a group of individuals that share a common user account and/or user computer 230.

It should be understood that, although the category preferences table 290 is illustrated in FIG. 2 as a single table, in practice it may be implemented as multiple distinct tables or other data structures. For example, one table may be used to store the individual user history scores, and another table may be used to store the collective user history scores.

The analysis module 280 uses the individual and collective scores stored in the category preferences table 290 to generate a user's relative preference profile, which identifies the user's predicted levels of interest in specific categories based on the user's activity history and the activity of other users. A user's relative preference profile preferably comprises a series of relative category preference scores indicating the degree to which the user's category preferences differ from those of the general user population. The recommendation/content personalization module 270 accesses a user's relative preference profile to make personalized recommendations and/or otherwise personalize the content of the Web site 210 for the user. Examples of how users' relative preference profiles may be used to personalize Web site content are provided below.

In some embodiments, the analysis module 280 updates the category preferences table 290 and the users' relative preference profiles periodically, such as once per day. In these embodiments, the category preferences table 290 and the relative preference profiles are stored in the user database 260, and the recommendation/content personalization module 270 accesses a user's relative preference profile from the user database 260 when the user initiates a browsing session or begins using the browse tree 100. The identity of the user may be determined using cookies, a log-in procedure, or another appropriate identification method.

In other embodiments, the category preferences table 290 and the users' relative preference profiles are updated in real-time as users browse the electronic catalog. In these embodiments, the recommendation/content personalization module 270 may access the relative preference profiles directly from the analysis module 280 rather than through the user database 260.

The analysis module 280 preferably generates a user's relative preference profile by updating the most recent version of the profile based on the user's activity history since the last update. Therefore, rather than evaluating the user's entire item selection history every time a new relative preference profile is generated, an existing relative preference profile may be updated incrementally to reflect the latest item selection events.

Figure 3:
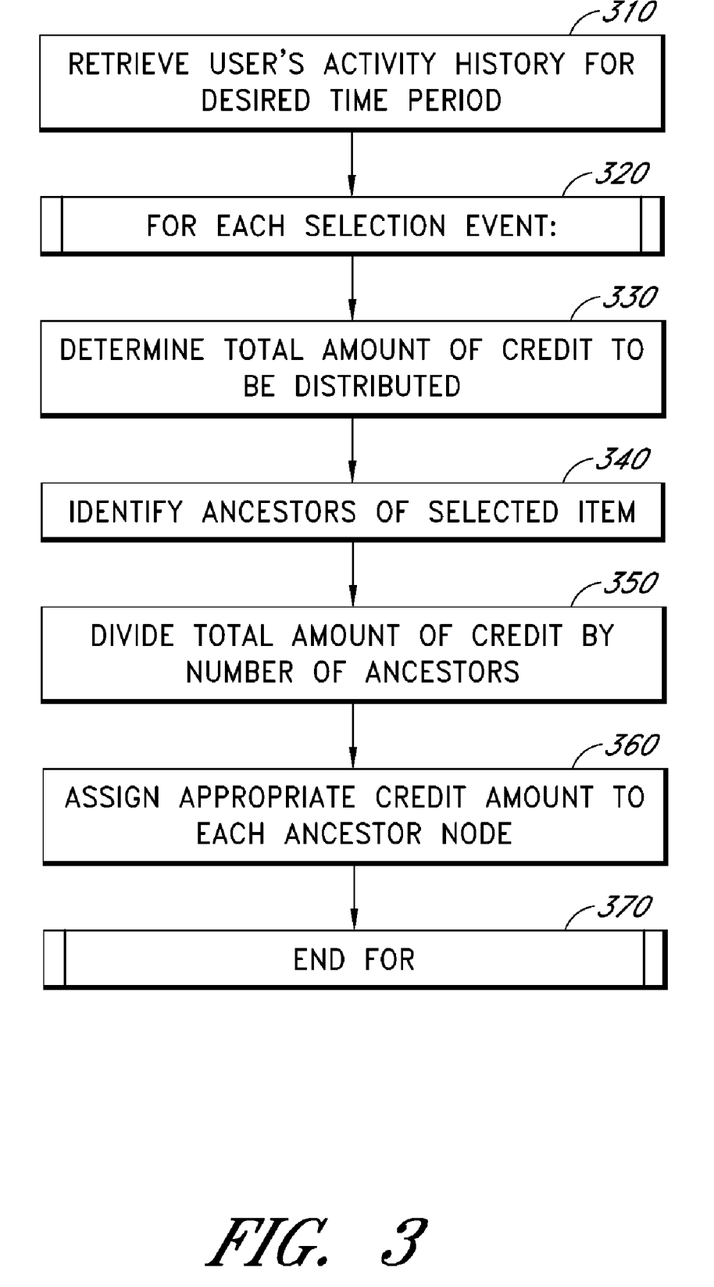
FIG. 3 illustrates a process for determining the individual user history scores of the category preferences table.

FIG. 3 illustrates an exemplary process for determining the individual user history scores of the category preferences table 290 for a given user. In block 310, the analysis module 280 retrieves the user's activity history (item selection history) over the time period of interest. Depending on a number of factors, the time period of interest may be a relatively short period of time (e.g., several hours or even shorter), a relatively long period of time (e.g., several weeks, months, years, or since inception of monitoring), or any intermediate period of time. In addition, the time period of interest can be adjusted to reflect the preferences of the Web site designer. Once the user's activity history has been retrieved, each selection event is evaluated individually (blocks 320 and 370).

In block 330, the analysis module 280 determines the total amount of credit to be distributed for a given selection event. As discussed above, the total amount of credit to be distributed may be a variable or fixed value. If the amount varies based on the nature of the selection event, then the analysis module 280 can determine the total amount of credit to be distributed by accessing a lookup table, such as the one depicted in Table 1. The amount of credit accorded to a given item selection event can also be dependent upon when the event occurred, with more recent selection events preferably being given more weight. In block 340, the analysis module 280 identifies each ancestor of the selected item. In block 350, the total amount of credit to be distributed for the selection event is divided by the number of ancestors of the selected item. In block 360, the analysis module 280 assigns credit to the ancestors of the selected item by adding the amount of credit calculated in block 350 to the current total scores for the appropriate (user, category) pairs, which correspond to the values stored in the appropriate cells in the category preferences table 290.

The process is then repeated for each selection event until the user's individual user history score for each category of the browse tree 100 has been determined. The analysis module 280 then repeats the process for every other user of the user population to determine their individual user history scores, and stores such scores in the category preferences table 290. The population of users whose individual user history scores are determined may comprise the entire user population of the Web site 210, or any subset thereof. Once the individual user history scores have been determined for all of the users of interest, the collective user history score is determined for each category.

The following example demonstrates how the method illustrated in FIG. 3 can be used to determine a user's individual user history scores based on specific activity. In this example, User 1 selects items I3, I7, and I9 to download during the time period of interest. For each of these selection events, the analysis module 280 determines the amount of credit per ancestor to be assigned by dividing the total amount of credit for the selection event by the number of ancestors of the respective item, as shown in Table 2.

TABLE 2

| Item Node | Selection Event | Total Credit | Ancestors | Credit per Ancestor |
|---|---|---|---|---|
| I3 | Download | 10 | C1, C2, C3, C4 | 10/4 = 2.5 |
| I7 | Download | 10 | C1, C3, C4, C5 | 10/4 = 2.5 |
| I9 | Download | 10 | C1, C3, C5 | 10/3 = 3.3 |

Once the credit per ancestor for a given selection event has been determined, the analysis module 280 assigns the credit to the respective ancestor nodes by adding the appropriate amount of credit to the user's individual user history scores for each of the ancestor nodes. The process is then repeated for each selection event. The individual user history scores of User 1 based on the activity described in this example are shown in Table 3.

TABLE 3

| Category Node | Assigned Credit |
|---|---|
| C1 | 2.5 + 2.5 + 3.3 = 8.3 |
| C2 | 2.5 |
| C3 | 2.5 + 2.5 + 3.3 = 8.3 |
| C4 | 2.5 + 2.5 = 5 |
| C5 | 2.5 + 3.3 = 5.8 |

The individual user history scores are stored in the category preferences table 290 or other appropriate data structure or repository, and the process is repeated to determine the individual user history scores for the remainder of the users of interest. The collective user history scores are then determined by adding the individual user history scores for each category. A sample category preferences table 290 with example individual user history scores and collective user history scores is shown in Table 4. In practice, the individual scores of many thousands or millions of users may be summed.

TABLE 4

|  | C1 | C2 | C3 | C4 | C5 |
|---|---|---|---|---|---|
| User 1 | 8.3 | 2.5 | 8.3 | 5.0 | 5.8 |
| User 2 | 7.5 | 5.0 | 2.5 | 2.5 | 2.5 |
| User 3 | 8.3 | 2.5 | 8.3 | 8.3 | 2.5 |
| User Population | 24.1 | 10.0 | 19.1 | 15.8 | 10.8 |

In a preferred embodiment, the individual user history scores are normalized by dividing each individual user history score of a user by the sum of the user's individual user history scores. These normalized individual user history scores represent a probability distribution of the user's predicted interest in the categories of the browse tree 100. The collective user history scores can also be normalized by dividing each collective user history score by the sum of the collective user history scores. These normalized collective user history scores represent a probability distribution of the predicted interest of the user population in the categories of the browse tree 100. A sample category preferences table 290 with normalized individual user history scores and collective user history scores is depicted in Table 5.

TABLE 5

|  | C1 | C2 | C3 | C4 | C5 |
|---|---|---|---|---|---|
| User 1 | 0.278 | 0.084 | 0.278 | 0.167 | 0.194 |
| User 2 | 0.375 | 0.250 | 0.125 | 0.125 | 0.125 |
| User 3 | 0.278 | 0.084 | 0.278 | 0.278 | 0.084 |
| User Population | 0.302 | 0.125 | 0.239 | 0.198 | 0.135 |

Because the item nodes I1-I9 of the browse tree 100 can have multiple parent nodes in some embodiments, the credit for a particular selection event can be distributed widely throughout the category nodes C1-C5 of the browse tree 100. Thus, for a given selection event, credit may be assigned to a category node that does not accurately reflect the interests of the user.

The category nodes that accurately reflect the interests of a user preferably accumulate credit from multiple selection events. In addition, the effects of the erroneous assignment of credit to category nodes that do not accurately reflect the interests of users are preferably distributed equally among the user population. Accordingly, one approach for distinguishing credits that accurately reflect a user's interests from those that do not is to compare the user's individual user history score for a given category to the collective user history score for the category. Using this approach, a user's relative preference profile can be determined.

Figure 4:
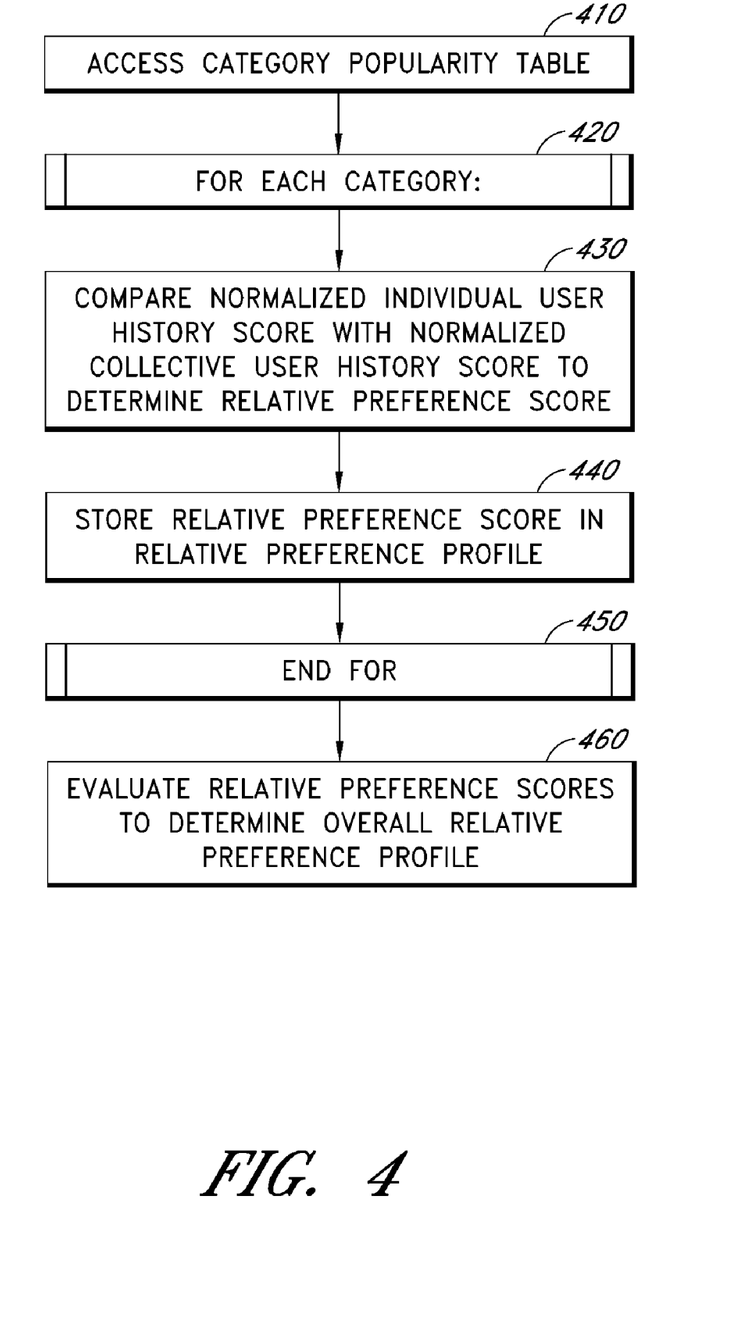
FIG. 4 illustrates a method for generating a user's relative preference profile.

FIG. 4 illustrates a method for generating a user's relative preference profile. In block 410, the category preferences table 290 or other appropriate data structure or repository is accessed. Each category within the category preferences table 290 is then evaluated individually (blocks 420 and 450). In block 430, the user's normalized individual history score for the category is compared with the normalized collective user history score for the same category to determine the user's relative preference score for the category. In block 440, the user's relative preference score for the category is stored in the user's relative preference profile. In block 460, which may be part of a separate personalization or recommendation process, the relative preference scores of the user are evaluated for purposes of providing personalized content to the user (e.g., recommendations of specific items or item categories). As discussed in more detail below, a user's relative preference profile can be accessed by a number of different processes or tasks to personalize the content of the Web site for the user in a variety of ways.

As discussed above, the user's normalized individual user history scores represent a probability distribution of the user's predicted interest in the categories of the browse tree 100. Similarly, the normalized collective user history scores represent a probability distribution of the predicted interest of the user population in the categories of the browse tree 100. A user's relative preference profile represents the distance between these two probability distributions. Thus, each relative preference score within a user's relative preference profile indicates the extent to which the user's predicted interest in a given category differs from the predicted interest of the user population in the category.

The distance between two probability distributions can be measured using a variety of well-known functions, such as, for example, the relative entropy of the two distributions, the dot product of the distributions, the sum of squares of the distributions, and the like. Any of these functions, or any other suitable function (or combination of functions), can be used to determine a user's relative preference profile by expressing the difference between the user's normalized individual user history scores and the normalized collective user history scores.

In one embodiment, the relative entropy function is used to calculate a user's relative preference profile. The relative entropy of two probability distributions is defined as:

$$RE(p(n) \| q(n)) = \sum_n p(n) \log \frac{p(n)}{q(n)}$$

where RE is the relative entropy, p is the first probability distribution, and q is the second probability distribution. Therefore, in this application, p(n) is the user's normalized individual user history score at a given node n of the browse tree 100, and q(n) is the normalized collective user history score at the same node n of the browse tree 100. If a user has a high relative entropy, this is an indication that the user is somewhat choosy or idiosyncratic, whereas a low relative entropy indicates that the user's preferences correspond to the norm for the user population.

In this embodiment, each summand of the relative entropy function represents the relative preference score for the corresponding node, or:

$$RP(n) = p(n) \log \frac{p(n)}{q(n)}$$

where RP(n) is the relative preference score for a given node n of the browse tree 100. Table 6 shows the relative preference scores based on the relative entropy function (log base 2), as well as the sum of the relative preference scores for the data of the sample normalized category preferences table 290 shown above in Table 5.

TABLE 6

|  | C1 | C2 | C3 | C4 | C5 | TOTAL |
| --- | --- | --- | --- | --- | --- | --- |
| User 1 | −0.034 | −0.049 | 0.059 | −0.041 | 0.101 | 0.037 |
| User 2 | 0.117 | 0.249 | −0.117 | −0.083 | −0.014 | 0.152 |
| User 3 | −0.034 | −0.049 | 0.059 | 0.135 | −0.058 | 0.054 |

Because a user's relative preference score for a given category takes into account the difference between the user's predicted interest in the category and the predicted interest of the user population, the relative preference score often provides a more accurate prediction of the user's interest in a category than the user's individual user history score for the category. For example, a user may have a high normalized individual user history score in a particular category but a low relative preference score if the category also has a high normalized collective user history score. This indicates that, while the user may be interested in the category, the user's interest is merely consistent with the interest of the user population in the category.

For instance, in the example described above, the highest normalized individual user history scores of User 1 are in Categories 1 and 3, but the user's relative preference scores in these categories are somewhat low because the categories also have high normalized collective user history scores. On the other hand, User 1 has a rather high relative preference score in Category 5 because the user's normalized individual user history score in the category is significantly higher than the normalized collective user history score in the category.

Because the manner in which a browse tree is structured is often somewhat arbitrary, it can be desirable to analyze the browse tree using algorithms that do not require the browse tree to be structured in a particular way. One advantage of using relative preference scores rather than individual user history scores to predict the interests of users is that the relative preference scores are less dependent on the particular structure of the browse tree. In addition, even if the structure of a given browse tree changes over time, the individual, collective, and relative preference scores can easily be recalculated based on the users' item selection histories and the new browse tree structure.

The following are examples of some of the ways a user's relative preference profile may be used to provide personalized content to that user:

Personalized ordering of category nodes within browse tree: During navigation of the browse tree 100, when a user selects a category node that has other categories as children, these other categories are displayed in order of highest to lowest relative preference score. Thus, for example, those categories for which the user has the highest relative preference will be displayed near the top of the list, and those for which the user has the lowest relative preference will be displayed near the bottom of the list.

Featured categories and/or items on home page: In one embodiment, the Web site's home page (also referred to as a gateway page) is personalized to include a display of specific items and/or categories that are deemed likely to be of interest to the user. These "featured" items and categories may be selected based in-whole or in-part on the user's relative preference profile. For instance, the web page may be personalized with a listing of the N categories for which the user's relative preference scores are the highest, and/or with items selected from such categories.

Personalized recommendations: Many Web sites provide a link or other option for allowing users to view personalized item recommendations. These recommendations may be generated based in-whole or in-part on the subject user's relative preference profile. For example, if a preexisting recommendations engine is used, the output (list of recommended items) of the recommendation engine can be ordered for display such that those items falling in categories for which the user's relative preference scores are the highest are displayed more prominently. In addition, items falling solely in categories for which the user has low relative preference scores may be displayed less prominently (e.g., at a lower position in the list), or may be filtered out.

Featured categories within browse tree: U.S. Pat. No. 6,489,968, the disclosure of which is hereby incorporated by reference, describes a system in which, when a user selects a category node at an upper level of a browse tree, the most popular categories and items falling multiple levels below the selected category are selected to present to the user as "featured" categories and items. Thus, categories and items that ordinarily would not be visible at the current level or branch of the browse tree, but which are (non-immediate) children of the selected category, are exposed to the user. One variation to this method is to select the categories and/or items to feature based in-whole or in-part on the user's relative preference profile. For example, when a user selects an upper level category node of the browse tree, the user's relative preference scores for all non-immediate child categories can be compared, and those with the highest scores can be selected to display (optionally together with selected items from such categories).

The foregoing and other personalization methods may be implemented within real-time personalization components that are executed by the Web site's servers in response to the actions of online users. Users' relative preference profiles may also be used for other purposes. For example, the relative preference profiles of users can be compared to identify "similar users" for purposes of implementing collaborative recommendations algorithms or for purposes of forming online communities.

As will be recognized, the methods described herein can also be used to profile entities other than users. Specifically, any entity that has a set of item IDs associated with it can be profiled by analyzing this set of item IDs in the same way that users' item selection histories are analyzed in the description above. For example, an item category or cluster can be profiled to identify the most similar categories or clusters.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims.

What is claimed is:

1. A computer-implemented method, comprising:
    recording item selection events in which users select particular items represented in an electronic data repository, said items arranged in a hierarchical browse structure that comprises multiple levels of item categories;
    generating relative preference profiles for particular users, each relative preference profile representing preferences of a respective user for particular item categories of said hierarchical browse structure relative to corresponding preference levels of a population of users, wherein generating the relative preference profiles comprises analyzing the recorded item selection events to assess users' preferences for particular item categories, wherein the relative preference profile for a user comprises a plurality of relative preference scores, each relative preference score corresponding to a respective item category and reflecting a degree to which the user's preference level for the item category differs from the user population's preference level for the item category; and
    selecting items to recommend to users based at least partly on the relative preference profiles of the users;
    said method performed in its entirely by a computer system.

2. The method of claim 1, wherein selecting items to recommend to users comprises identifying similar users based on comparisons of the relative preference profiles of the users, and using the identified similar users to implement a collaborative recommendations algorithm.

3. The method of claim 1, wherein generating the relative preference profiles comprises:
    determining a total amount of credit to be distributed for an item selection event in which the user selected an item that is categorized in the hierarchical browse structure;
    identifying a plurality of ancestor categories of the selected item in the hierarchical browse structure;
    dividing said total amount of credit by the number of ancestor categories of the selected item to determine an amount of credit per ancestor category to be distributed for the item selection event; and
    assigning said amount of credit per ancestor category to each of the ancestor categories.

4. The method of claim 1, wherein the method comprises generating the relative preference scores by a process that comprises:
    generating a first normalized score representing a preference level of the user for a selected item category, said normalized score based on item selections of the user;
    generating a second normalized score representing a preference level of the user population for the selected item category, said second normalized score based on item selections of a plurality of users; and
    comparing the first normalized score to the second normalized score to determine a relative preference score for the selected item category.

5. The method of claim 4, wherein comparing the first normalized score to the second normalized score comprises applying an entropy function to the first and second normalized scores.

6. The method of claim 1, wherein generating the relative preference profiles comprises:
    determining an amount of credit to be distributed for an item selection event in which a user selected an item; and
    distributing said amount of credit among a plurality of item categories under which the item falls in said hierarchical browse structure.

7. The method of claim 1, wherein the computer system comprises a plurality of servers.

8. An interactive system, comprising:
    a server system coupled to a communications network, said server system configured to provide interactive user access to a hierarchical browse structure in which items represented in a data repository are arranged in a hierarchy of item categories, said hierarchy comprising multiple levels of item categories, said server system configured to record item selection events in which users select particular items represented in the data repository;
    an analysis component configured to use the recorded item selection events to generate relative preference profiles for particular users, each relative preference profile representing preferences of a respective user for particular item categories of said hierarchy relative to corresponding category preference levels of a population of users, wherein the relative preference profile for a user comprises a plurality of relative preference scores, each relative preference score corresponding to a respective item category and reflecting a degree to which the user's preference level for the item category differs from the user population's preference level for the item category; and a recommendation module configured to use the relative preference profiles to select items to recommend to particular users.

9. The interactive system of claim 8, wherein the interactive system is configured to identify similar users based on comparisons of the relative preference profiles of the users.

10. The interactive system of claim 8, wherein the interactive system is configured to implement a collaborative recommendations process in which users are matched to similar users based on comparisons of the relative preference profiles of the users.

11. The interactive system of claim 8, wherein the recommendation module is configured to rank a set of item recommendations for presentation to a user based at least partly on the relative preference profile of the user.

12. The interactive system of claim 8, wherein the analysis component is configured to generate the relative preference scores by a process that comprises:

generating a first normalized score representing a preference level of the user for a selected item category, said normalized score based on item selections of the user;

generating a second normalized score representing a preference level of the user population for the selected item category; and comparing the first normalized score to the second normalized score to determine a relative preference score for the selected item category.

13. The interactive system of claim 12, wherein the analysis component is configured to compare the first normalized score to the second normalized score using a relative entropy function.

14. The interactive system of claim 8, wherein the analysis component is configured to assess the user's preferences for particular item categories by a process that comprises:

determining an amount of credit to be distributed for an item selection event in which the user selected an item; and distributing said amount of credit among a plurality of item categories under which the item falls in said hierarchical browse structure.

15. The interactive system of claim 8, wherein the items are products represented in an electronic catalog.

16. The interactive system of claim 8, wherein the analysis component is configured to assess the user's preferences for particular item categories by a process that comprises:

determining a total amount of credit to be distributed for an item selection event in which the user selected an item that is categorized in the hierarchical browse structure;

identifying a plurality of ancestor item categories of the selected item in the hierarchical browse structure; and dividing said total amount of credit by the number of ancestor item categories of the selected item to determine an amount of credit per ancestor item category to be distributed for the item selection event.

17. The interactive system of claim 16, wherein determining the total amount of credit comprises selecting an amount that depends upon a type of the item selection event, such that different total credit amounts are used for different types of item selection events.

18. Non-transitory computer storage having stored thereon executable code that directs a computer system to perform a process that comprises:

recording item selection events in which users select particular items represented in an electronic data repository, said items arranged in a hierarchical browse structure that comprises multiple levels of item categories;

generating relative preference profiles for particular users, each relative preference profile representing preferences of a respective user for particular item categories of said hierarchical browse structure relative to corresponding preference levels of a population of users, wherein generating the relative preference profiles comprises analyzing the recorded item selection events to assess users' preferences for particular item categories, wherein the relative preference profile for a user comprises a plurality of relative preference scores, each relative preference score corresponding to a respective item category and reflecting a degree to which the user's preference level for the item category differs from the user population's preference level for the item category; and selecting items to recommend to users based at least partly on the relative preference profiles of the users.

* * * * *